United States Patent [19]

Hedderly et al.

[11] Patent Number: 5,487,562
[45] Date of Patent: Jan. 30, 1996

[54] ENERGY ABSORBING APPARATUS FOR A MOTOR VEHICLE

[75] Inventors: Gregory T. Hedderly, Livonia; Lisa A. Tyus, Belleville; Leonard M. Brown, Farmington Hills, all of Mich.

[73] Assignee: Ford Motor Company, Dearborn, Mich.

[21] Appl. No.: 364,908

[22] Filed: Dec. 27, 1994

[51] Int. Cl.[6] ............................... B62D 1/11; B60R 22/28
[52] U.S. Cl. ..................... 280/777; 280/805; 188/371; 188/374
[58] Field of Search ........................ 280/777, 805, 280/801.1; 188/371, 374

[56] References Cited

U.S. PATENT DOCUMENTS

| | | | |
|---|---|---|---|
| 3,195,685 | 7/1965 | Blackstone | 280/805 |
| 3,444,962 | 5/1969 | Lech | 188/371 |
| 3,547,468 | 12/1970 | Giuffrida | 280/805 |
| 3,561,690 | 2/1971 | Muskat | 280/805 |
| 4,006,647 | 2/1977 | Oonuma et al. | 188/371 |
| 4,027,905 | 6/1977 | Shimogawa et al. | 280/805 |
| 4,273,361 | 6/1981 | Takei et al. | 280/805 |
| 4,358,136 | 11/1982 | Tsuge et al. | 280/805 |
| 4,630,716 | 12/1986 | Faust | 188/371 |
| 4,978,139 | 12/1990 | Andres et al. | 280/805 |
| 5,024,118 | 6/1991 | Khalifa et al. | 74/492 |
| 5,067,747 | 11/1991 | Yokoyama | 280/777 |
| 5,356,179 | 10/1994 | Hildebrandt et al. | 280/777 |

*Primary Examiner*—Kenneth R. Rice
*Attorney, Agent, or Firm*—Gregory P. Brown; Roger L. May

[57] ABSTRACT

An energy absorbing apparatus having a deformable strip (20) with prefabricated projections (28) thereon is disclosed for use in passive restraint systems of motor vehicles (10). Examples are shown with the energy absorbing apparatus integrated in a steering column system (12) and a seat belt system (14). Specifically, the prefabricated projections (28) on the deformable strip (20) permit an impact force to be dissipated at a variable rate as the deformable strip (20) is drawn through a set of rollers (30,32).

17 Claims, 4 Drawing Sheets

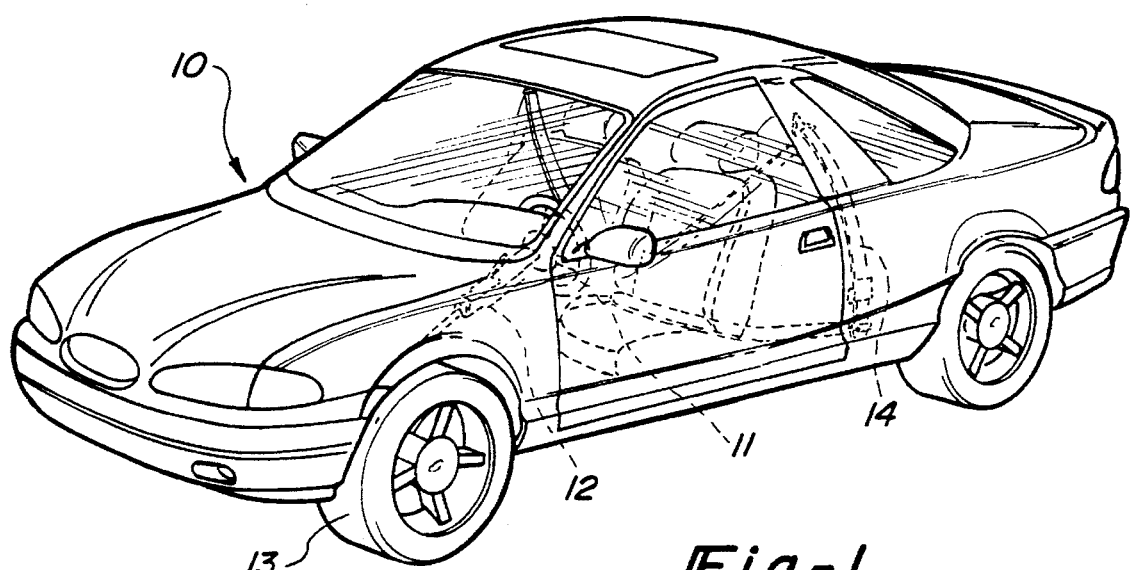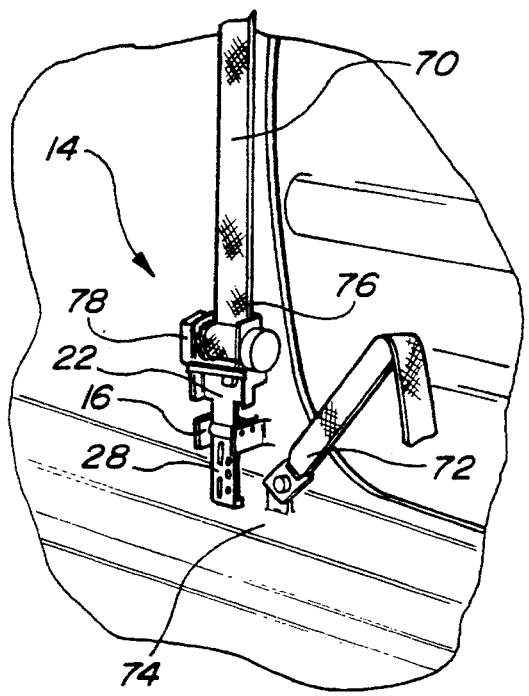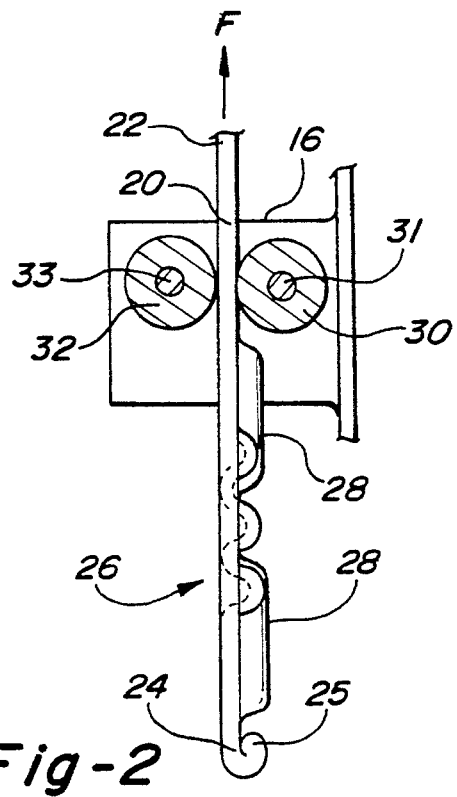

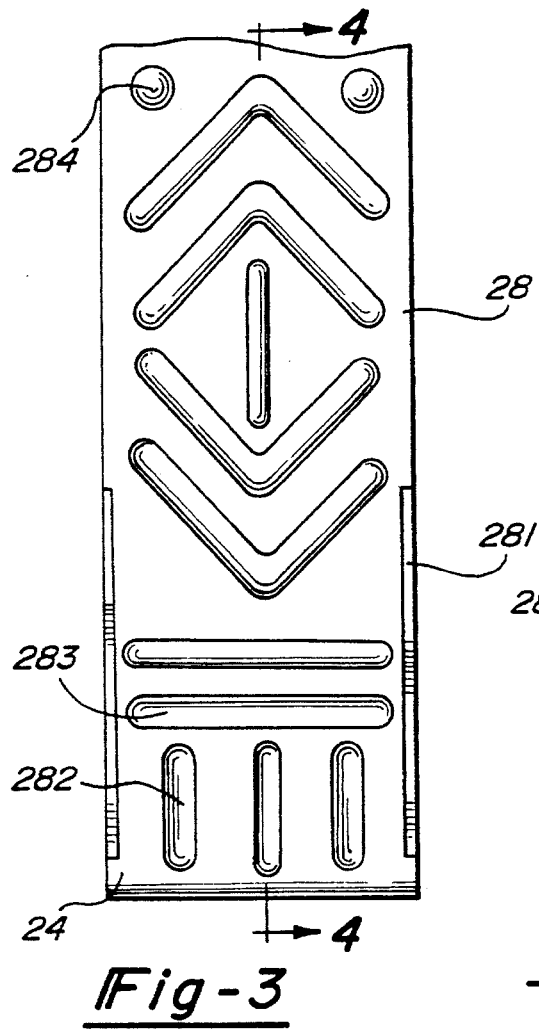
Fig-3
Fig-4
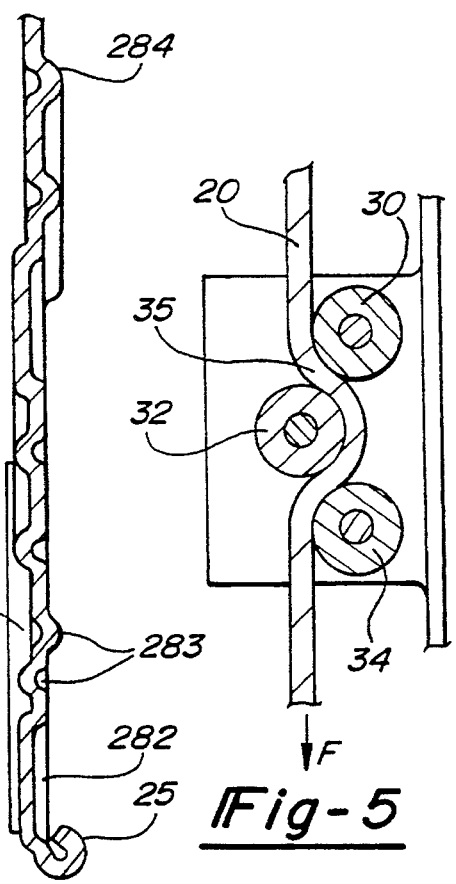
Fig-5
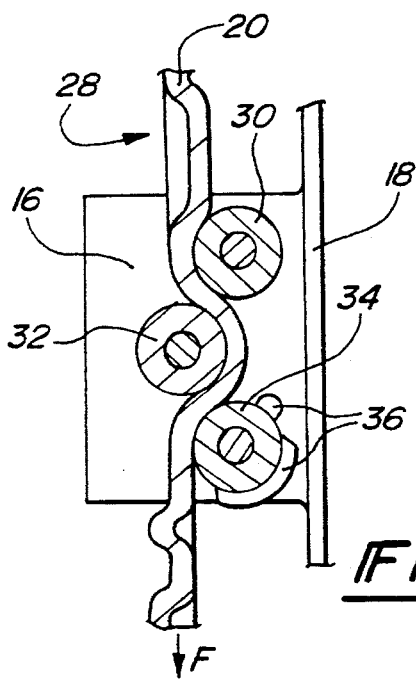
Fig-6
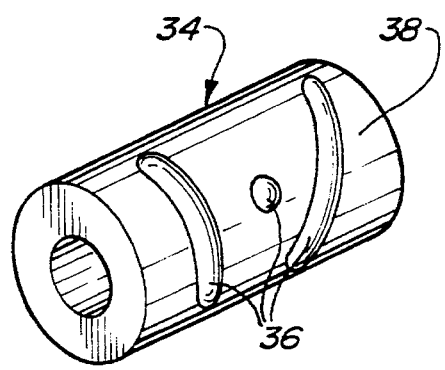
Fig-7

5,487,562

ENERGY ABSORBING APPARATUS FOR A MOTOR VEHICLE

BACKGROUND OF THE INVENTION

1. Field of the Invention

This invention relates generally to occupant restraints as used in motor vehicles. More specifically, the present invention relates to an energy absorbing apparatus for use in occupant restraint systems, such as seat belts and steering columns, that provides variable energy absorption.

2. Disclosure Information

Energy absorbing devices for controlling the deceleration of an object have been used in motor vehicles for some time. Generally, all of these devices operate in response to being subjected to a impact force exceeding a predetermined minimum value. The energy associated with this impact force is dissipated by controllably decelerating the impacting object. This deceleration occurs over a predetermined distance while a device absorbs the energy initially possessed by the impacting object.

One such system is disclosed in U.S. Pat. No. 4,027,905, which illustrates a seat belt system for a motor vehicle having an energy absorbing device anchoring the seat belt to a motor vehicle body structure. Responsive to an impact force in excess of a predetermined minimum, a planar steel strip is forcibly drawn through a plurality of pins causing the strip to plastically deform, thereby absorbing energy. As the strip is drawn through the pins, the impacting object decelerates within a predetermined maximum deceleration. To maintain the initial deceleration below the predetermined maximum requires the proper selection of the thickness, width and material properties of the strip. After the initial deceleration, however, due to momentum and friction effects the impacting object may decelerate at a rate considerably less than the predetermined deceleration maximum. This results in a considerable reduction in the energy absorbed for a given distance of travel than might otherwise be desired.

It would therefore be desirable to have a energy absorbing system capable of variable impact force dissipation properties.

SUMMARY OF THE INVENTION

The present invention provides an energy absorbing apparatus for a motor vehicle, including a deformable strip having preformed projections for providing variable force dissipation during the displacement of the strip through a set of rollers.

In the presently preferred embodiment, the energy absorbing apparatus comprises an anchor securely attached to the motor vehicle and first and second rollers rotatably mounted to the anchor and being disposed spaced from one another. The energy absorbing apparatus further includes a deformable strip threaded through the first and second rollers. The deformable strip includes a first end adapted to receive an impact force from within the motor vehicle, a second end opposite the first end and a formed portion extending from the rollers to the second end. The formed portion includes prefabricated projections operative to be drawn through the first and second rollers when the impact force exceeds a predetermined minimum. The prefabricated projections are plastically deformed in a predetermined order to provide variable withdrawal resistance of the formed portion, thereby controllably dissipating and absorbing energy from the impact force.

It is an advantage of the energy absorber to provide variable force dissipation as deformable strip is drawn through the rollers.

Other objects, features and advantages of the present invention will become apparent to those skilled in the art from the drawings, detailed description and claims which follow.

BRIEF DESCRIPTION OF THE DRAWINGS

FIG. 1 is perspective drawing of a motor vehicle incorporating an energy absorbing apparatus according to the present invention.

FIG. 2 is a top view of a first embodiment of an energy absorbing apparatus according to the present invention.

FIG. 3 is a side view of a first embodiment of an energy absorbing apparatus according to the present invention.

FIG. 4 is a sectional view taken from FIG. 3 showing prefabricated projections in a formed portion of an energy absorbing apparatus according to the present invention.

FIG. 5 is a top view of a second embodiment of an energy absorbing apparatus according to the present invention.

FIG. 6 is a top view of a second embodiment having protuberances on a third roller of an energy absorbing apparatus according to the present invention.

FIG. 7 is a perspective view of a third roller having protuberances on its outer circumference according to the present invention.

FIG. 10 is a perspective view of a seat belt system having an energy absorbing apparatus according to the present invention.

DETAILED DESCRIPTION OF THE PREFERRED EMBODIMENTS

Figure 8:
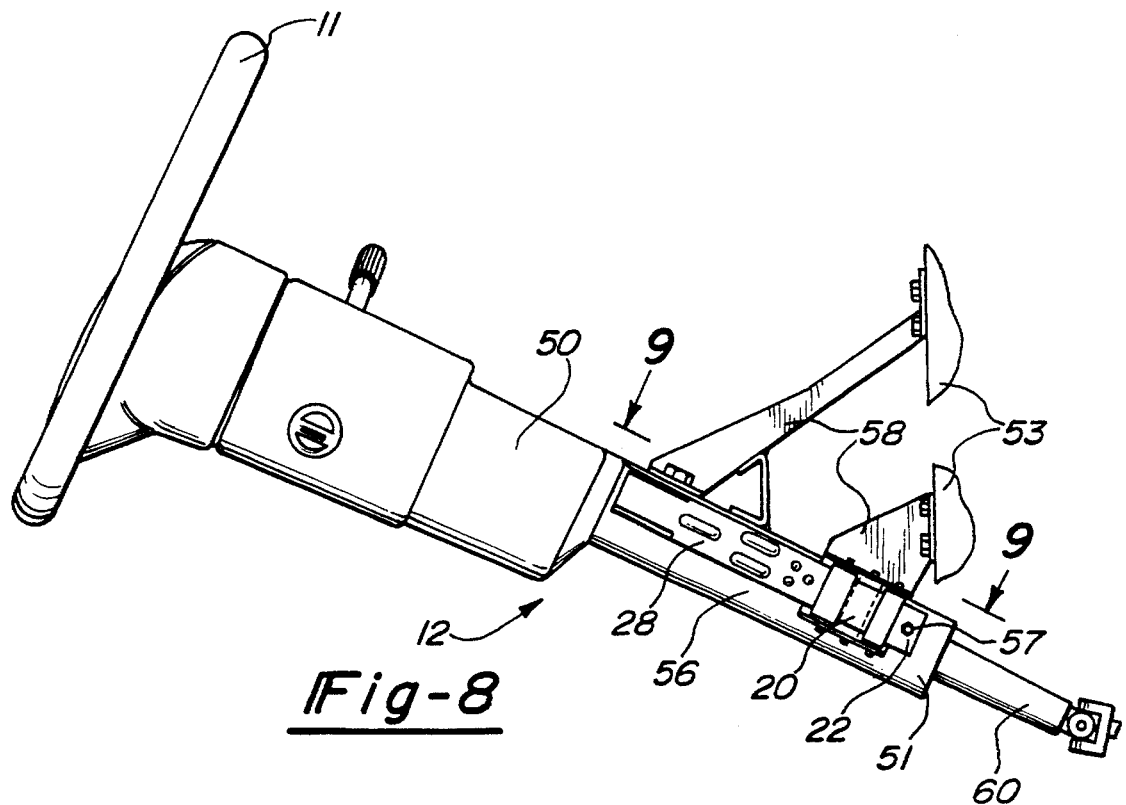
FIG. 8 is a side view of a steering column having an energy absorbing apparatus according to the present invention.

Referring now to the figures, FIG. 1 illustrates a motor vehicle 10 having a steering column system 12 for presenting a steering wheel 11 to an operator of the motor vehicle 10. The steering wheel 11 is connected to a pair of dirigible road wheels 13 for steering the motor vehicle 10. The motor vehicle also includes a seat belt system 14 for restraining occupants within the motor vehicle. As will be explained in detail below, an energy absorbing apparatus according to the present invention may be integrated into systems such as the steering column system 12 and the seat belt system 14.

Referring to FIGS. 2–4, a first embodiment of the present invention will now be described. An anchor 16 securely attaches the energy absorbing apparatus to a structural member within the motor vehicle 10, such as rocker panel 18. First and second rollers 30, 32 are rotatably mounted to the anchor 16. This could be accomplished using axles 31, 33 or an equivalent, such as axle stubs (not shown) axially protruding from each end of the rollers 30, 32 and rotatably received within a receptacle in the anchor 16. The rollers 30, 32 are spaced apart a predetermined distance to receive a deformable strip 20 therebetween. In the preferred embodiment, the rotational axes of the rollers 30, 32 lie in a plane transverse to a longitudinal axis of the deformable strip 20. However, additional energy absorption may be achieved by spacing the rotational axes of the rollers 30, 32 in a plane substantially parallel with the longitudinal axis of the deformable strip 20, thereby increasing the energy absorption capacity by imparting a bend in the deformable strip 20.

The deformable strip 20 includes a first end 22 attached to a component within the motor vehicle 10 for transferring an impact force (F) into a tension force within the deformable strip 20. The deformable strip 20 also includes a travel stop 25 disposed at a second end 24, opposite the first end 22. A formed portion 26 extends a predetermined distance from the second end 24 toward the first end 22. The formed portion 26 includes a predetermined arrangement of prefabricated projections 28. The prefabricated projections 28 may take many forms and sizes, depending on the energy absorption required in a particular application. Some examples are shown, including longitudinal flanges 281 extending substantially perpendicularly from opposite edges of the deformable strip 20, longitudinal and transverse V-shaped ribs 282, and 283 spherical indentations 284. Many other shapes and sequences of prefabricated projections 28 are contemplated to achieve the desired impact force dissipation characteristics required for a given application.

FIGS. 5–7 show a second embodiment utilizing a third roller 34 combined with first and second rollers 30, 32 aligned substantially parallel to the longitudinal axis of the deformable strip 20. (Unless otherwise noted, like numerals refer to like parts among various embodiments.) In its simplest form, the third roller 34 imparts an additional bend 35 in the deformable strip 20, thereby increasing the overall energy absorption. However, where additional energy absorption may be required for only a particular stage of strip 20 withdrawal, the third roller 34 may include radial protuberances 36 extending from an outer circumference 38, thereby imparting additional cold working as the protuberances 36 works the formed strip 20.

In the preferred embodiment, the deformable strip 20 is stamped from mild steel and the rollers 30, 32 are forged and ground from steel and then heat treated to provide a toughened surface that will withstand deforming the prefabricated projections 28. Where additional energy absorption may be required, both the thickness and the material may be satisfactorily varied. For instance, it may be necessary to use a high strength steel having a much higher yield strength than mild steel.

Figure 9:
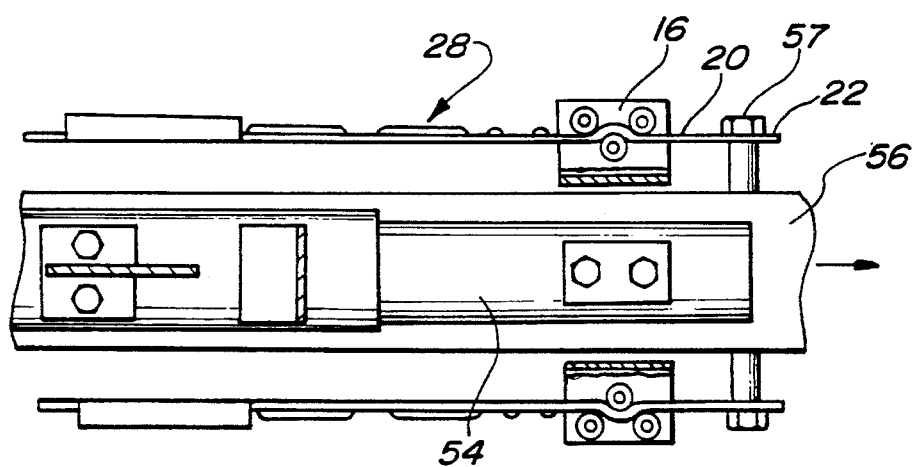
FIG. 9 is a sectional view taken from FIG. 8 showing the top of a steering column having an energy absorbing apparatus according to the present invention.

Referring now to FIGS. 8 and 9, a steering column system 12 having an energy absorbing apparatus according to the present invention is shown. The steering column system includes a steering column 50 extending from steering wheel 11 to a lower end 51 and a steering shaft 60 extending therefrom for transmitting steering wheel rotation to a steering mechanism (not shown). The steering column 50 further includes an outer member 56 axially disposed about an inner member 54. A support member 58 supports the inner member 54 from a portion of the body structure 53 and permits relative axial movement between the inner member 54 and the outer member 56 when the steering wheel 11 is loaded by an impact force. The outer member 56 attaches to the energy absorbing apparatus using fasteners 57 passing through the first end 22 of the deformable strip 20. The anchor 16 securely fastens the rollers 30, 32, 34 to the support member 58.

FIG. 10 illustrates a seat belt system 14 having an energy absorbing apparatus according to the present invention. The seat belt system 14 includes seat belt 70 having one end 72 securely attached to a rocker panel 74 and the opposite end 76 attached to a conventional locking retractor mechanism 78. The retractor mechanism 78 is attached to the energy absorbing apparatus at the first end 22 of the deformable strip 20. An anchor 16 is securely attached to the rocker panel 74 and supports the rollers 30, 32 through which the strip 20 passes.

Figure 11:
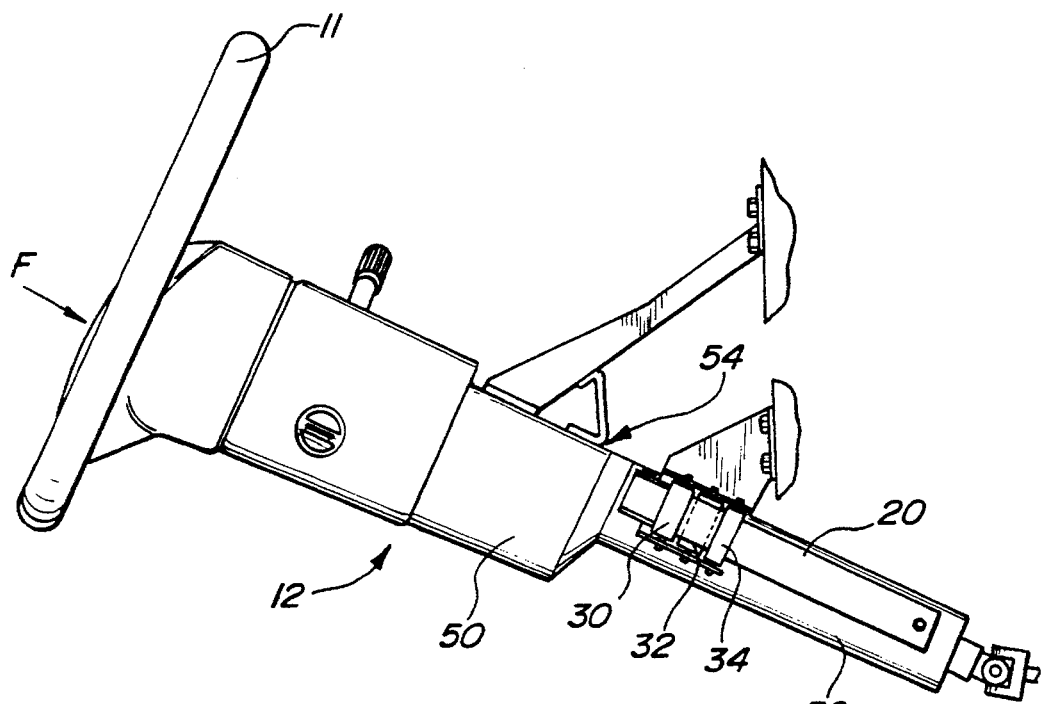
FIG. 11 is a side view of a steering column having an energy absorbing apparatus that has absorbed energy from an impact force according to the present invention.
Figure 12:
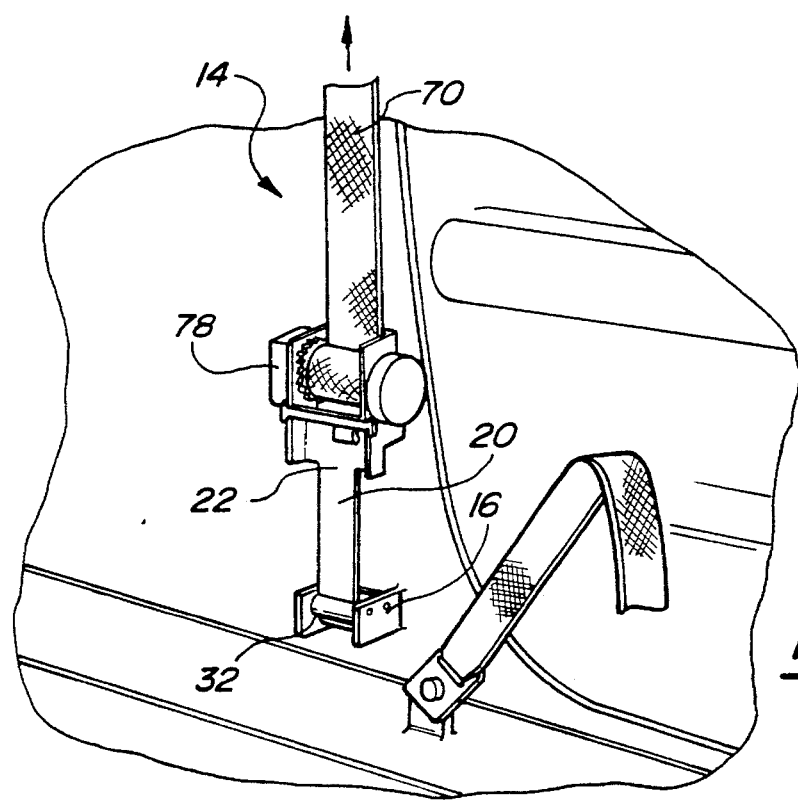
FIG. 12 is a side view of a seat belt system having an energy absorbing apparatus that has absorbed energy from an impact force according to the present invention.

Operation of the present invention will now be described with reference to FIGS. 11 and 12. In the steering column system 12, an object impacts the steering wheel 52 generating an impact force in proportion to the deceleration of the object. When the impact force exceeds a predetermined minimum, the outer member 56 begins to move relative to the inner member 54. This motion is impeded by the deformation of the deformable strip 20, thereby controlling the deceleration of the object impacting the steering wheel 11 and the dissipation of the impact force (F). It is desirable to control the rate at which this impacting object is decelerated and this can be done by controlling the dissipation of the impact force (F) that the outer member 56 transfers to the deformable strip 20.

Initially, movement of the deformable strip 20 is impeded by static friction at the rollers 30, 32, 34 and the resistance of the deformable strip 20 to plastic deformation. Once the impact force (F) exceeds this predetermined resistance, the rate at which the impact force (F) is dissipated is dependent on the amount of dynamic friction within the rollers 30, 32, 34 and the amount material that is cold worked as the deformable strip 20 is drawn through the rollers 30, 32, 34. By varying the shape, number and sequence of prefabricated projections 28, the impact force dissipation can be programmed to vary continuously as the deformable strip 20 passes through the rollers 30, 32, 34.

Operation of the seat belt system 14 with the energy absorber is similar to that of the steering column system 12. An impact force (F) results from the impact of an object within the motor vehicle 10 upon the seat belt 70 sufficient to lock the retractor mechanism 78. The tension force in the seat belt 70 is thereby transferred to the first end 22 of the deformable strip 20. This impact force (F) is dissipated in the same manner as the steering column system once the impact force (F) exceeds a predetermined minimum, thereby flattening the formed portion 26 to provide variable impact force dissipation.

The foregoing description presents two exemplary applications of the present invention. Details of construction have been shown and described for purposes of illustration rather than limitation. Modifications and alterations of the invention may occur to those skilled in the art. For example, it is contemplated that an energy absorbing apparatus according to the present invention could have many applications beyond seat belts and steering columns. For instance, it is contemplated that the present invention could be adapted to absorb the impact force associated with a vertical impact transmitted by a passenger seat in an aircraft. Therefore, it is the following claims, including all equivalents, that define the scope of my invention.

We claim:

1. An energy absorbing apparatus for use in a motor vehicle, said energy absorbing apparatus comprising:

an anchor securely attached to said motor vehicle;

first and second rollers rotatably mounted to said anchor spaced apart from one another; and a deformable strip threaded through said first and second rollers, said deformable strip comprising:

a first end adapted to receive an impact force from within said motor vehicle;

a second end opposite said first end; and a formed portion extending from said rollers to said second end, said formed portion includes prefabricated projections operative to be drawn through said first and second rollers when said impact force exceeds a predetermined minimum, said prefabricated projections thereby being plastically deformed in a predetermined order to provide variable withdrawal resistance of said formed portion, thereby controllably dissipating and absorbing energy from said impact force.

2. An energy absorbing apparatus according to claim 1, wherein said prefabricated projections comprise longitudinal flanges extending substantially perpendicularly from opposite edges of said formed portion of said deformable strip.

3. An energy absorbing apparatus according to claim 1, wherein said prefabricated projections comprise longitudinal V-shaped ribs.

4. An energy absorbing apparatus according to claim 1, wherein said prefabricated projections comprise transverse V-shaped ribs.

5. An energy absorbing apparatus according to claim 1, wherein said prefabricated projections comprise spherical indentations.

6. An energy absorbing apparatus according to claim 1, wherein said energy absorbing apparatus further comprises a third roller rotatably mounted to said anchor, said first, second and third roller being disposed spaced from one another with said deformable strip threaded therebetween, said third roller combining with said first and second rollers to provide additional resistance to withdrawal by sequentially bending said formed portion partially around said first, second and third rollers.

7. An energy absorbing apparatus according to claim 6, wherein said third roller includes protuberances projecting radially outward from an outer circumference for plastically forming secondary projections on said deformable strip after having rolled said prefabricated projections substantially flat by drawing said formed portion of said deformable strip through said first and second rollers, said third roller thereby providing additional resistance to withdrawal.

8. An energy absorbing apparatus according to claim 7, wherein said protuberances on said third roller only partially extend over said outer circumference of said third roller so as to provide additional variability in said withdrawal resistance of said formed portion for controllably dissipating said impact force.

9. An energy absorbing steering column apparatus for use in a motor vehicle, said steering column apparatus comprising:

a steering column having an inner member within an outer member, said inner member being supported by a support member attached to body structure of said motor vehicle, said outer member being adapted to move axially relative to said inner member when subjected to an impact within said motor vehicle generating an impact force in excess of a predetermined minimum;

an anchor securely attached to said outer member of said steering column;

first and second rollers rotatably mounted to said anchor disposed spaced from one another; and a deformable strip threaded through said first and second rollers, said deformable strip comprising:

a first end adapted to receive an impact force from within said motor vehicle;

a second end opposite said first end; and a formed portion extending from said rollers to said second end, said formed portion includes prefabricated projections operative to be drawn through said first and second rollers when said impact force exceeds a predetermined minimum, said prefabricated projections thereby being plastically deformed in a predetermined order to provide variable withdrawal resistance of said formed portion, thereby controllably dissipating and absorbing energy from said impact force.

10. An energy absorbing apparatus according to claim 9, wherein said prefabricated projections comprise longitudinal flanges extending substantially perpendicularly from opposite edges of said formed portion of said deformable strip.

11. An energy absorbing apparatus according to claim 9, wherein said prefabricated projections comprise longitudinal V-shaped ribs.

12. An energy absorbing apparatus according to claim 9, wherein said prefabricated projections comprise transverse V-shaped ribs.

13. An energy absorbing apparatus according to claim 9, wherein said prefabricated projections comprise spherical indentations.

14. An energy absorbing apparatus according to claim 9, wherein said energy absorbing apparatus further comprises a third roller rotatably mounted to said anchor, said first, second and third roller being disposed spaced from one another with said deformable strip threaded therebetween, said third roller combining with said first and second rollers to provide additional resistance to withdrawal by sequentially bending said formed portion partially around said first, second and third rollers.

15. An energy absorbing apparatus according to claim 14, wherein said third roller includes protuberances projecting radially outward from an outer circumference for plastically forming secondary projections on said deformable strip after having removed said prefabricated projections by drawing said formed portion of said deformable strip through said first and second rollers, said third roller thereby providing additional resistance to withdrawal.

16. An energy absorbing apparatus according to claim 15, wherein said protuberances on said third roller only partially extend over said outer circumference of said third roller so as to provide additional variability in said withdrawal resistance of said formed portion for controllably dissipating said impact force.

17. An energy absorbing seat belt apparatus for use in a motor vehicle, said seat belt apparatus comprising:

a seat belt having one end securely attached to the motor vehicle and an opposite end attached to a belt retractor mechanism, said seat belt retractor adapted to transfer an impact force from within said motor vehicle when said impact force exceeds a predetermined minimum;

an anchor securely attached to a said motor vehicle;

a first end attached to said retractor mechanism and adapted to receive said impact force therefrom;

first and second rollers rotatably mounted to said anchor disposed spaced from one another; and a deformable strip threaded through said first and second rollers, said deformable strip comprising:

a first end attached to said retractor mechanism and adapted to receive an impact force from within said motor vehicle;

a second end opposite said first end; and a formed portion extending from said rollers to said second end, said formed portion includes prefabricated projections operative to be drawn through said first and second rollers when said impact force exceeds a predetermined minimum, said prefabricated projections thereby being plastically deformed in a predetermined order to provide variable withdrawal resistance of said formed portion, thereby controllably dissipating and absorbing energy from said impact force.

* * * * *